TERNARY ERROR CORRECTOR-ERROR DETECTOR METHOD AND SYSTEM

Filed Aug. 27, 1965

INVENTOR.
CHARLES F. HOBBS
BY Harry A. Herbert Jr. and
George Fine
ATTORNEYS

TERNARY ERROR CORRECTOR-ERROR DETECTOR METHOD AND SYSTEM

Filed Aug. 27, 1965 Sheet 2 of 2

INVENTOR.
CHARLES F. HOBBS
BY Harry A. Herbert Jr.
George Fine
ATTORNEYS

United States Patent Office 3,453,593
Patented July 1, 1969

3,453,593
TERNARY ERROR CORRECTOR-ERROR DETECTOR METHOD AND SYSTEM

Charles F. Hobbs, Medford, Mass., assignor to the United States of America as represented by the Secretary of the Air Force Filed Aug. 27, 1965, Ser. No. 483,373
Int. Cl. G08b *29/00;* G06f *11/10*
U.S. Cl. 340—146.1 8 Claims

ABSTRACT OF THE DISCLOSURE

An error detection and correction system for use with a digital communication system with data being transmitted in the form of code groups of binary signals in which most errors are prevented by the use of a detector which erases the digits most probably in error, the blanks resulting from the erasures are filled in by use of a set of parity check equations for the code and residual errors are detected by parity checks.

Figure 1:
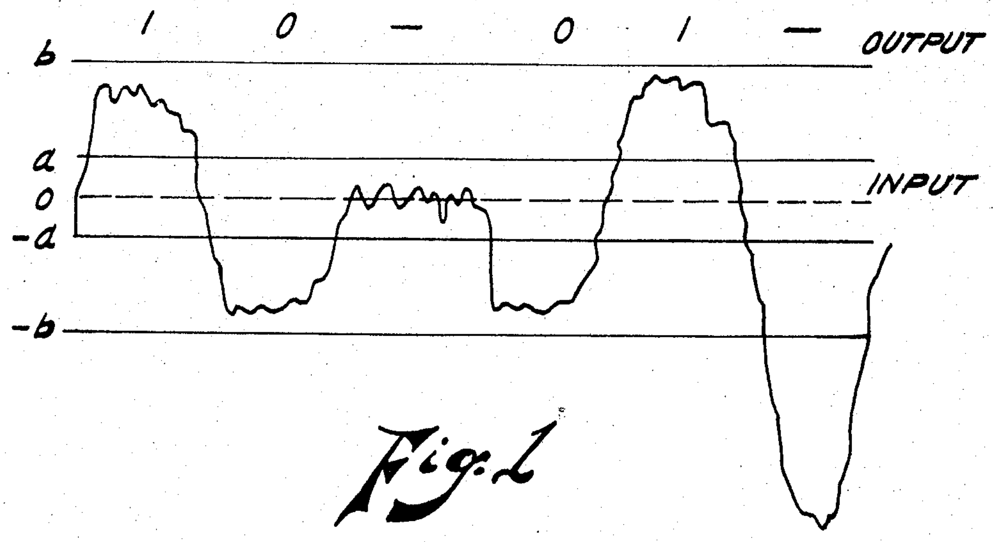

The invention described herein may be manufactured and used by or for the United States Government for governmental purposes without payment to me of any royalty thereon.

This invention relates to an error detection and correction system designed for use with a digital communication system in which data is transmitted in the form of code groups of binary signals.

If $k$ binary digits are to be transmitted over a communications channel disturbed by noise and interference, it is often possible to detect and correct errors if $n$ digits ($n>k$) are used to transmit the $k$-digit sequence. Thus error detection and error correction are made possible if $n-k$ excess or redundant digits are added to the $k$ information digits. A set of $n$ digit sequences representing all possible $k$-digit sequences is known as a code.

A code may be constructed by randomly selecting an $n$-digit sequence to represent each $k$-digit sequence. This is known as random coding. Since there are only $2^k$ $n$-digit sequences in a binary code and since $n>k$ there are a great many possible $n$ digit sequences that are not elements (or words) of the code. Nevertheless, corruption of the signal by the channel during transmission makes it possible to receive any of the $2^n$ $n$-digit binary sequences with a finite probability. Thus to decode a random binary code requires a code book with $2^n$ entries in it, a clearly impossible situation for all but very small $n$.

Because of the difficulty of decoding random codes much effort has gone into finding codes which can be generated systematically. One result has been the finding of codes which satisfy the properties of algebraic groups and hence are called group codes. When a group code is used, certain rules called parity check rules permit the $n-k$ redundant (parity checks) digits to be easily generated. Use of the same rules permit errors to be detected and with suitable logical computation circuitry, many errors can be corrected. However, the computations for correction can become very involved since the simultaneous solution of several binary equations is required.

A class of group codes known as cyclic codes lead to simple encoding and relatively simple decoding techniques. In cyclic codes, if the first parity check equation is given by $x_{k+1}=x_1 \oplus x_a \oplus x_b \ldots \oplus x_c \ldots$ then the second one is given by $x_{k+2}=x_2 \oplus x_{a+1} \oplus x_{b+1} \oplus \ldots x_{c+1}$ by each of a complete set of parity check equations and the digits covered have the same relationship to each other in all equations. Since there is one parity check equation for each (parity check) digit then a complete set of parity check equations is defined by the aforementioned $n-k$ redundant (parity check) digits. The subscripts for the aforegoing equations are reflected in the previously mentioned $k$ binary digits and $k$-digit sequence so that the subscript $k$ is defined as the number of information digits; $k+1$ represents first digit following sequence of information digits; $x_1$ is first digit in sequence of a word; $x_a$, $x_b$, $x_c$ are particular numbers of digits in a word, etc. This constant relationship permits a shift register with fixed feedback connections and modulo 2 adders to be used to generate a code word from any set of $k$ information digits. Even for cyclic codes, if $n$ and $k$ are large, the decoding circuitry required to correct a large percentage of the error configurations which the code is capable of correcting requires circuitry of considerable complexity.

When the total capability of a code is used for error correction, every block of $n$ digits received is interpreted as one of the $k$-digit message sequences. This procedure is known as maximum likelihood decoding. The interpretation of every received sequence as a code word is a distinct disadvantage if the channel is subject to wide fluctuations in noise and interference since under poor channel conditions most of the message blocks will be received incorrectly and the user may not be aware of this fact. On the other hand, if the total capability of the code is used to detect errors, "failsafe" operation results, i.e., very few message blocks that are accepted will contain errors. However, the information rate falls to zero as soon as the channel conditions become so poor that at least one error is caused in each code word transmitted.

The most useful type of decoding for many applications is one in which most error configurations which the code being used is capable of correcting unambiguously are corrected but all configurations for which the probability of decoding error is greater than some specified value are rejected. This method results in failsafe decoding in which the probability of accepting a message block containing errors is limited regardless of the channel conditions.

The probability of making decoding errors using failsafe decoding depends on the code and the number of redundant digits used; the larger the code is the less the redundancy (percentage wise) is that is necessary to give the same failsafe performance. For this reason, failsafe decoding methods must be simple enough to facilitate their use with large codes.

In an effort to achieve simplified decoders, the possibility of using detectors with non-zero thresholds have been proposed by some workers in the field. It is reasoned that blanks created by erasures of digits through use of such detectors should be easier to fill in than errors because the location of the blanks are known whereas errors must be located before they can be corrected. It turns out that almost twice as many blanks can be filled in by a code as the number of errors that can be corrected by the same code. It also turns out that with an optimum threshold setting the binary erasure channel is more efficient than the binary symmetric channel which has zero threshold. This is because less information is destroyed through the making of errors in detection so the rate of transmission is higher for the erasure channel.

The disadvantage of a binary erasure channel in which the only decoding done is to fill in blanks is that if errors remain in the unerased digits, these go undetected. Thus a maximum likelihood decoding results. Occasionally some blank configurations are uncorrectable so the fact that decoding of these is not complete is obvious.

The present invention includes a failsafe decoding technique for group codes which, in effect, provides error correction capabilities approaching the theoretical limit of the code and rejects configurations which would have a large likelihood of containing errors if error correction were attempted. Such rejection can be used as the basis for a request for retransmission in a feedback communication system. In one-way systems having high signal-to-noise ratios occasional rejection of message blocks would be less objectionable than acceptance of blocks containing errors. In one-way systems having low signal-to-noise ratios it is desirable to send each block a sufficient number of times so that the probability of at least one of them being decoded correctly is very high.

This invention avoids the complex circuitry required by some error correction techniques to solve a set of simultaneous parity check equations. The decoder proper is preceded by a threshold detector which converts each video message block corresponding to a transmitted $n$ digit binary code word into a sequence of $n$ ternary digits of ones, zeros, and blanks. During any particular digit interval the signal is interpreted as a one or a zero only if the signal integrated over the interval falls between two ampitude levels $a$ and $b$. Otherwise the signal is interpreted as a blank (see FIGURE 1). The smaller threshold discriminates against low level signals while the larger threshold discriminates against impulsive noise. In both cases the probability of making an error if a one vs. zero decision were made should be greater than for the signals falling between the levels $a$ and $b$. In practice the threshold levels $a$ and $b$ are set to maximize the information rate.

Upon detection the digits of each message block are serially loaded into an $n$-digit 3-state shift register after which decoding takes place. The digits covered by each of a set of parity check equations are examined iteratively. Whenever a single blank is covered by an equation it is filled in with a one or a zero depending upon which one satisfies the equation. If two or more blanks are covered by one equation, no action is taken. Often one or more of these will be filled in when another equation is examined and on subsequent examination of the same equation it may be found that only one, or perhaps even none, blank remains to be filled in. However, if all of the set of equations are examined in turn without finding any single blanks but some multiple sets of blanks remain, too many blanks were formed so the block is rejected.

If at any point in the iterative decoding process a set of digits covered by a parity check equation is complete, i.e., does not contain any blanks, and does not satisfy the parity check, i.e., the digits do not sum to zero modulo 2, the block is rejected also. It is only when the complete set of equations have been examined iteratively without encountering either blanks or errors that the block is accepted.

In accordance with the present invention known parity check techniques are combined with a novel threshold detector which thereby increases the likelihood of detecting transpositional and other type errors which heretofore have been largely undetectable by parity checks. Specifically, the threshold detector of the present invention converts each incoming video message unit representing a transmitted code word into a sequence of ternary digits of ones, zeroes, and blanks as follows:

(a) Any incoming signal falling within positive amplitude levels $a$ and $b$ is read as one.

(b) Any signal falling within negative amplitude levels $-a$ and $-b$ is read as zero; and (c) Any signal not falling within these two spaced bands is read as a blank.

Thus, as the $a$ thresholds are designed to discriminate against unreliable low level signals and the $b$ thresholds against high level noise distorted signals, the incoming signals most likely to be in error are read and identified as blanks subject to correction by the system. During the correction cycle the detected digits of each message block are serially loaded into a shift register for decoding where the digits covered by each of a set of parity check equations are examined iteratively. Whenever only a single blank in a message block is covered by a check equation that blank is filled by a zero or a one so as to satisfy the equation. In the event two or more blanks are covered by an equation no immediate action may be taken. However, if one or more of these blanks are corrected, a subsequent examination of the first equation may then show a single covered blank eligible to be filled. For this reason whenever one blank is filled during a complete decoding cycle, at least one additional cycle through each check equation is made before the correction mode is ended.

Decoding of a message unit is considered to be successful only if no blanks remain in that unit and all parities check. Therefore, upon termination of a correction mode the now unnecessary parity check digits of correctly decoded message unit are replaced by the label digit zero whereby those units may be identified upon transfer to the system output for storage or ultimate use. Each rejected message unit is given the label digit one for identification at the output or to facilitate a possible request for retransmission, for example. It is to be noted that the theory of the present invention appears in a paper entitled, "Failsafe Decoding by Blank Correction and Error Detection," by the present inventor Charles F. Hobbs of Air Force Cambridge Research Laboratories (OAR), Bedford, Mass.

An object of the present invention is to provide an error detection and correction method and system for use with a digital communication system.

Another object of the present invention is to provide an error detection and correction method and system for use with a digital communication system in which data is transmitted in the form of code groups of binary signals.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described a preferred embodiment of the invention.

Figure 2:
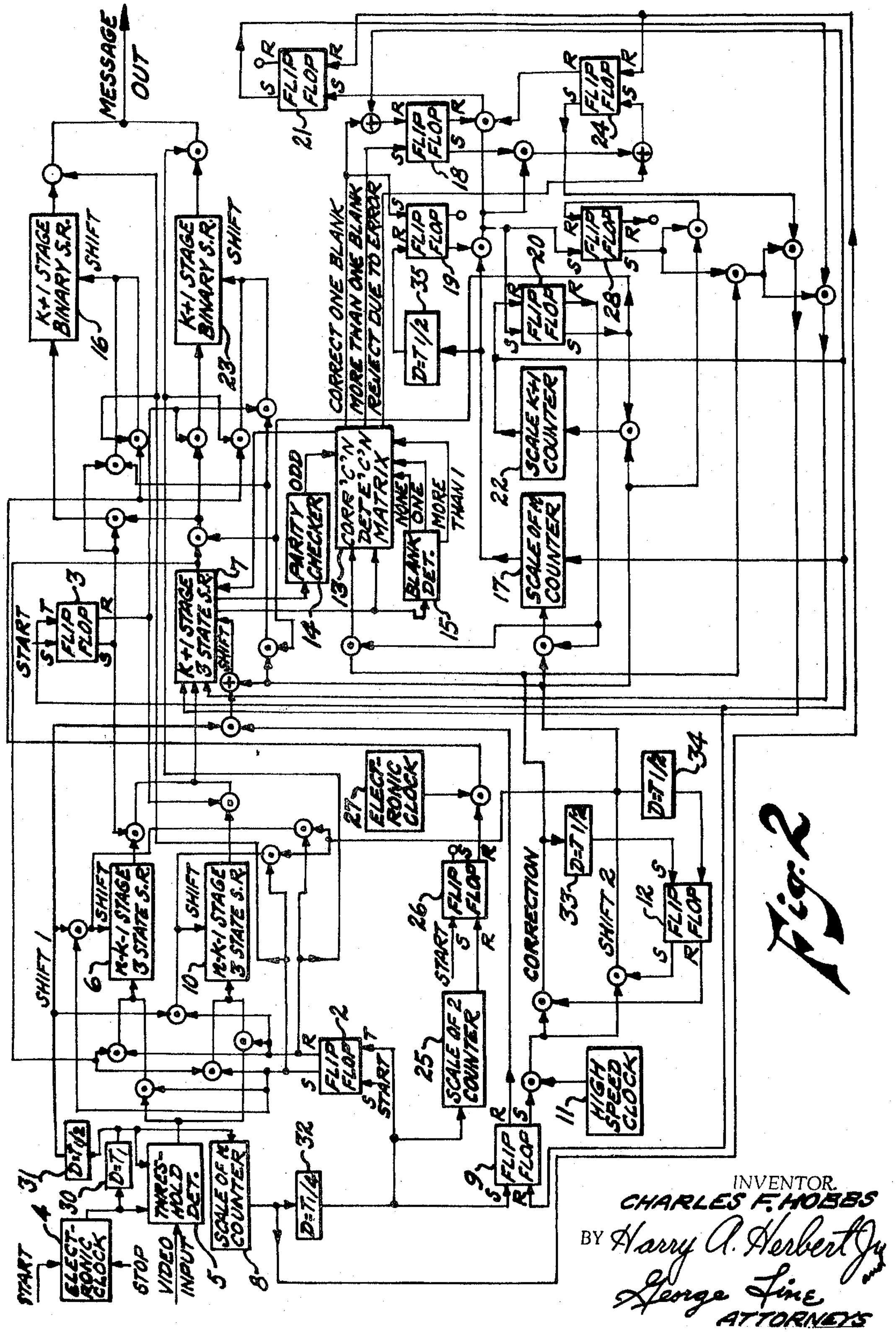

Of the drawings:

FIGURE 1 illustrates the waveforms associated with the threshold detection of the present invention; and FIGURE 2 shows a preferred embodiment of the present invention in block diagram form.

A decoder designed to be used with an $(n, k)$ cyclic code will now be described. Blocks will be used throughout to describe circuit functions the detailed circuitry for which can be readily designed by anyone skilled in the art of logical circuit design. $n$ and $k$ can have any values for which cyclic codes exist. These blocks should be considered to be only representative of my invention. Similar blocks and circuitry for decoders to be used with other systematic block codes can be designed by any one skilled in the art after studying the description of the decoder for cyclic codes given below.

A decoder for a $(n, k)$ cyclic code according to my invention is shown in the block diagram of FIGURE 2. The decoder is started by the application of an external START trigger pulse to the S input of flip-flops 2, 3 and 26 and electronic clock 4. After starting, periodic pulses occuring at the same rate and phase as the incoming message digits are applied to the decoder by electronic clock 4 directly to threshold detector 5. The periodic pulses are also passed through delays 30 and 31, one having a delay period of $T_1$ and the other of $T1/2$, respectively. Immediately following the START pulse the bipolar analogue video message derived from a radio receiver, wire communication lines or from any other suitable source is applied to the threshold detector 5. The first pulse from electronic clock 4 sets the integration circuit of the threshold detector to zero to initiate signal integration and after a delay of T provided by delay 30, where T, is the message pulse period, reads out a one, zero or blank depending on the polarity and amplitude of the integrated signal in accordance with FIGURE 1.

When flip-flop 2 is set to state S the output of threshold detector 5 is connected to the input of the ($n-k-1$) stage 3 state shift register 6 and the SHIFT 1 bus is connected to the shift input of shift register 6. SHIFT 1 pulses are derived from the pulses produced by electronic clock 4 and are used to serially load and shift successive digits produced by threshold detector 5 into shift register 6. When flip-flop 3 is set to S the output of shift register 6 is connected to the input of shift register 7 to form an $n$-digit shift register. Since flip-flop 9 is originally in the R state SHIFT 1 is applied to 7 each time it is applied to 6. After $n-1$ shifts shift register 6 and shift register 7 contain a block of $n$ ternary digits which are ready to be decoded. Before the $n$th shift can take place, the scale of $n$ counter 8 produces a trigger pulse passing through delay 32 having a delay period of T¼ which triggers flip-flop 2 to state R and sets flip-flop 9 to state S.

When flip-flop 2 is triggered to R, the output of detector 5 is disconnected from the input of shift register 6 and is connected to the input of shift register 10, the SHIFT 1 bus is disconnected from shift register 6 and is connected to shift register 10, the SHIFT 2 bus is disconnected from shift register 10 and is connected to shift register 6, and the output of shift register 7 is disconnected from the input of shift register 10 and connected to the input of shift register 6. This produces a $n$-digit recirculating shift register consisting of shift register 6 and shift register 7 connected in series.

When flip-flop 9 is set to S, the SHIFT 1 bus is disconnected from shift register 7 and a high speed clock 11 is connected to the CORRECTION bus since flip-flop 12 is initially in the R state. The first pulse from high speed clock 11 sets flip-flop 12 to S disconnecting high speed clock 11 from the CORRECTION bus and connecting it to the SHIFT 2 bus. However, before flip-flop 12 is set to S the first pulse is applied to the correction-detection matrix 13. It is to be noted the two inputs to flip-flop 12 are passed through delays 33 and 34, both having a delay of T½.

The parity checker 14, the blank detector 15 and the correction-detection matrix 13 are permanently connected to the stages of shift register 7 corresponding to the parity check sequence of the code. At any particular time the output of parity checker 14 is high if an odd number of the stages of shift register 7 to which connections are made have ones stored in them. One of the three outputs of blank detector 15 is high depending upon the number of blanks stored in the same stages of shift register 7. The three mutually exclusive outputs are NONE, ONE and MORE THAN ONE.

When a CORRECTION pulse is applied to matrix 13, it is distributed by the matrix to none, one or two outputs depending upon the inputs to matrix 13 from parity checker 14 and blank detector 15.

(a) If the output from parity checker 14 is high indicating an ODD number of ones and the output from detector 15 is NONE, the output from matrix 13 is REJECT DUE TO ERROR.

(b) If the output from parity checker 14 is high (or low) and the output from blank detector 15 is ONE, the outputs from matrix 13 are CORRECT ONE BLANK and a signal to shift register 7 to fill in the indicated blank with a one (or a zero).

(c) If the output from blank detector 15 is MORE THAN ONE, the output from matrix 13 is MORE THAN ONE BLANK regardless of the output from parity checker 14.

(d) If the output from parity checker 14 is low and the output from blank detector 15 is NONE, no outputs are produced by matrix 13.

Initially, and at the beginning of each set of $n$ shift pulses supplied by the SHIFT 2 bus, flip-flop 19 is in state R. Also flip-flop 20 is in state R so the scale of $n$ counter 17 is connected to the SHIFT 2 bus. The $n$th shift pulse produces a trigger output from counter 17 which goes to flip-flop 19 by way of delay 35 which has a delay of T½. The effect of the trigger is to terminate the correction mode if flip-flop 19 is still in state R, otherwise the correction mode continues for another $n$ shifts. The several alternatives are given in the following paragraphs.

If flip-flop 19 is still in state R when the trigger pulse is produced by counter 17, the trigger pulse is directed to flip-flop 20 whose state it changes to S thus disconnecting the SHIFT 2 bus from the input of counter 17 and connecting it to the scale of $k+1$ counter 22. Also the $k+1$ stage binary shift register 16 is connected to the output of shift register 7 and the SHIFT 2 bus.

If no output is obtained from the correction detection matrix 13 during an $n$-pulse correction cycle, flip-flops 18, 19, and 24 remain in their original R states. The trigger pulse from counter 17 is then applied to flip-flop 21 which it sets to the S state and to flip-flop 20 to end the correction mode as described above.

If a REJECT DUE TO ERROR output is obtained from the correction-detection matrix 13 at any time during the correction mode, flip-flop 24 is set to state S and remains there throughout the rest of the decoding mode. If flip-flop 19 is in the R state when a trigger pulse from counter 17 occurs, the latter is directed to flip-flop 20 to end the correction mode regardless of the setting of flip-flop 18. Also regardless of the setting of flip-flop 18, the trigger pulse is inhibited from reaching flip-flop 21 which therefore remains in the R state.

If one or more MORE THAN ONE BLANK outputs are obtained from matrix 13 during a $n$-pulse correction cycle, flip-flop 18 is set to the S state. Then, if no CORRECT ONE BLANK output is obtained during the $n$-pulse correction cycle flip-flop 19 remains in the R state and the trigger pulse from counter 17 is directed to flip-flop 20 to end the correction mode and to flip-flop 24 which it sets to S if it is not already in that state due to a REJECT DUE TO ERROR output from matrix 13.

Any time a CORRECT ONE BLANK output is obtained from matrix 13 flip-flop 19 is set to state S. When the trigger pulse is produced by counter 17 it cannot reach flip-flop 20 so the correction mode continues for another $n$ shifts.

Whenever the trigger pulse from counter 17 is applied to flip-flop 20 to end the correction mode, it is also applied to flip-flop 28 which it sets to state S. With flip-flop 28 in state S the next CORRECTION pulse is applied to two gates under the control of the S outputs of flip-flops 21 and 24 respectively. If flip-flop 21 is in state S indicating correct decoding, the correction pulse is directed to the "correct to zero" input of the leftmost stage of shift register 7. If flip-flop 24 is in state S indicating rejection, the correction pulse is directed to the "correct to one" input of the same stage of shift register 7. The zero or one loaded into shift register 7 at this time is a labeling digit used to indicate the quality of the $k$ information digits stored in the other $k$ stages of shift register 7. A zero label means the information digits are correct with a high degree of reliability and a one label means the information digits are unreliable.

The next SHIFT 2 pulse resets flip-flop 28 to the R state so no further corrections are made to shift register 7 during the current decoding mode.

With flip-flop 20 in state S the scale of $k+1$ counter 22 is connected to the SHIFT 2 bus for the succeeding $k+1$ pulses. The ($k+1$)th pulse produces a trigger output from counter 22 which resets flip-flop 20 to R to disconnect counter 22 from the SHIFT 2 bus.

Each time a set of $n$ shifts of the recirculating shift register consisting of shift register 6 and shift register 7 connected end to end takes place in the correction mode, the $k$ information digits are returned to the last $k$ stages of shift register 7. With flip-flops 3 and 20 in the S states, the output of shift register 7 is connected to the input of the $k+1$ stage binary shift register 16 and the SHIFT 2 bus is connected to the shift input of shift register 16. Thus the $k+1$ additional shifts occurring just before the trigger pulse is produced by counter 22 shifts the information digits and the labeling digit into shift register 16 which acts as an output buffer storage register. If correction has been successfully completed, shift register 7 will contain only ones and zeros at the end of $n$ shifts, even though it is a 3 state register. In this case the labeling digit will be zero. If correction has not been completed, the $k$ information digits shifted into shift register 16 may contain errors. This possibility will be indicated by a "one" label. If one or more blanks are contained in shift register 7 when the transfer to the output buffer storage register begins, they are arbitrarily converted to zeroes as they leave shift register 7.

The trigger pulse output from counter 22 resets flip-flop 9 to state R to end the decoding mode. It also resets flip-flop 18 to R if necessary, triggers flip-flop 3 from S to R and disconnects the output of shift register 7 from the input of shift register 16.

While the correction mode is in processing using shift register 6 and shift register 7 up to $n-k-1$ digits from the next message block can be loaded into shift register 10 under control of electronic clock 4. At the end of the first decoding mode the trigger from counter 22 triggers flip-flop 3 from state S to state R and in so doing the input of shift register 7 is disconnected from the output of shift register 6 and connected to the output of shift register 10 to form another $n$ digit shift register which is fully loaded when counter 8 produces another trigger to start the next correct mode.

NOTE.—The relative clock speeds are such that the decoding mode is always completed by the time the next $n-k-1$ digits are detected by the threshold detector 5. Typical speeds for clocks 4 and 11 are 100 kp. p.s. and 5 Mp. p.s., respectively. If decoding of a (73, 45) code is being performed, the 73 digit shift register is completely recycled four times in 116.8 $\mu$sec. if a 5 Mp. p.s. clock is used for 11. With a 100 Kp. p.s. data rate at the decoder input the number of digits that are loaded into shift register 6 or shift register 10 in this length of time is 12 whereas the capacity of each register is 27 digits. It is possible for the 73 digits to be recycled 9 times in the correction mode before shift register 6 or shift register 10 can be filled with new digits.

When the second set of $n$ digits have been loaded in shift register 10 and shift register 7 a second trigger pulse from counter 8 initiates another decoding mode which differs from the first only in that shift register 10 and shift register 7 are used as the recirculating shift register and shift register 23 is used for the output buffer storage register. This is because flip-flop 2 is in the S state and flip-flop 3 is in the R state during decoding rather than vice versa.

The second output from counter 8 produces a trigger pulse from the scale of 2 counter 25 which sets flip-flop 26 to state R. With flip-flop 2 in state S and 26 in state R, electronic clock 27 is connected to the shift input of shift register 16 and the output of shift register 16 is connected to the message sink. If the speed of clock 27 is $(k+1)/n$ that of clock 4, shift register 6 will be completely unloaded when the detection of the third set of $n$ digits is complete. The second set of $k$ information digits and their label will be loaded in shift register 23 awaiting readout which begins as soon as flip-flop 2 is triggered to the R state by the third trigger pulse from counter 8.

The third $n$ digit message block is handled in exactly the same way as the first. Decoding of successive message blocks continues until a reset pulse is applied to the STOP input of electronic clock 4 to end decoding. While decoding, it is seen that odd numbered message blocks use shift registers 6, 7 and 16 while even numbered blocks use 10, 7 and 23 under the control of flip-flops 2 and 3.

The operations performed by the decoder illustrated by FIGURE 2 will now be summarized. After the decoder is started by a trigger pulse derived from a suitable preamble or by other means the incoming signal is integrated and sampled over successive periodic intervals of time $T_1$. Each sample is interpreted as representing a transmitted one or zero, depending on the polarity, if the amplitude $q$ falls within the interval $a<q<b$. If $q<a$ or $q>b$, a blank is recorded regardless of the polarity of the signal.

After a sequence of $n$ ones, zeroes and/or blanks have been serially loaded in a shift register the register is connected end to end to form a recirculating shift register. Succeeding digits are loaded into another register while those in the recirculating register are being decoded. Corrections and shifts of the digits in the recirculating shift register are made under the control of a high speed electronic clock. Between shifts the digits covered by a parity check equation are sampled to determine the number of blanks and ones contained therein. If there are no blanks either (a) the number of ones is even and the parity check is satisfied or (b) the number of ones is odd and a reject signal is generated. If there is one blank, it is filled in with a zero if the number of ones is even or with a one if the number of ones is odd. If there are more than one blanks, a tentative reject signal is generated which becomes final if no blank is filled in during a $n$-shift decoding cycle. Whenever a blank is filled in during a $n$-shift decoding cycle, at least one additional $n$-shift cycle must be performed before the correction mode can be ended.

When the correction mode is terminated, there is no further need for the check digits. The first of these is replaced by a label which indicates whether or not the decoding has been successful. The decoding is considered to have been successful if no blanks remain and all parities check. In this case the label digit is a zero otherwise it is a one.

Immediately following the termination of the correction mode and the loading of the labeling digit, the information digits along with their label are transferred to a temporary storage register following which they are transferred to the output where they may be used or put in permanent storage. If the communications system is two way, request for repeat of those sets having a reject label (one) may be made.

While decoding of one set of $n$-digits is being carried out, the beginning of a succeeding set is being detected and loaded into another register which is used as part of the recirculating shift register during the next correction mode. At the same time the previous set of $k$ information digits and their label is being delivered to the user. Before this delivery is completed, the new decoding mode will be completed and the next set of $k$ information digits and their label will be loaded in a second buffer register and be ready to be read out.

Thus it is seen that once reception is started digits are received in a continuous stream at a rate depending on the transmission rate and are delivered in a continuous stream to the user at a rate $K+1/n$ of the transmission rate $R_1$. There is a delay of 2 $n/R_1$ between the detection of the first digit of a code word and the delivery of the first information digit of that code word to the user. The delay is the same for all succeeding code words also.

What I claim is:

1. An error detection and correction system for use with a digital communication system with data being transmitted in the form of code groups of binary signals comprising a threshold detector for converting each incoming video message unit representing a transmitted code word into a sequence of digits of ones, zeroes, and blanks wherein any incoming signal falling within a first spaced band of positive amplitude levels $a$ and $b$ being read as one, any incoming signals falling within a second spaced band of negative amplitude levels $-a$ and $-b$ being read as zero, and any incoming signals not falling within these two aforesaid spaced bands being read as a blank, a shift register, means for serially loading into said shift register the detected digits of each message unit for decoding with the digits defined by each of a set of parity check equations being examined iteratively, means to determine the occurrence of a single blank in a message unit defined by a check equation so as to satisfy said equation, said blank occurrence determining means being connected to and receiving an input from said shift register, and means to substitute a zero or a one upon the occurrence and in place of said single blank, said substituting means receiving an input simultaneously from said blank occurrence determining means and said shift register.

2. An error detection and correction system for use with a digital communication system with data being transmitted in the form of code groups of binary signals comprising a threshold detector for converting each incoming video message unit representing a transmitted code word into a sequence of digits of ones, zeroes, and blanks wherein any incoming signal falling within a first spaced band of positive amplitude levels *a* and *b* being read as one, any incoming signals falling within a second spaced band of negative amplitude levels $-a$ and $-b$ being read as zero, and any incoming signals not falling within said two spaced bands being read as a blank, a shift register, means for serially loading into said shift register the detected digits of each message unit for decoding with the digits covered by each of a set of parity check equations being examined iteratively, means to determine the occurrence of a single blank in said message unit covered by a check equation so as to satisfy said check equation, said single blank occurrence determining means being connected to and receiving an input from said shift register, and means to further examine and fill in with a zero or one said message unit upon the occurrence and in place of said single blank, said examining means being connected to and receiving simultaneously inputs from said shift register and said single blank occurrence determining means.

3. An error detection and correction system for use with a digital communication system with data being transmitted in the form of code groups of binary signals comprising means for integrating and sampling an incoming signal over successive periodic intervals of a preselected time, means for interpreting each integrated sample as representing a transmitted one or zero depending on the polarity of a preselected amplitude band, a blank being recorded when not within said band, a first shift register, means to serially load into said first shift register a preselected sequence of said interpreted ones, zeroes and blanks, means to connect said first shift register end to end to form a recirculating register after said serial loading operation, means to load succeeding digits from said interpreting means into a second register during a decoding period of said recirculating register, means connected to said recirculating shift register to correct and shift the digits in said recirculating shift register, between said shifts the digits covered by a parity check equation being sampled to determine the number of blanks and ones contained therein, means also connected to said recirculating shift register to generate a reject signal with the number of ones being odd, blank detecting means connected and receiving an input from said recirculating register to determine the occurrence of one blank, more than one blank or no blanks, means receiving an input from said blank detecting means to substitute a zero upon the occurrence of one blank, means also receiving an input from said blank detecting means to generate a tentative reject signal upon the ocurrence of a multiplicity of blanks, said tentative reject signal becoming final upon the failure to fill in any blank during a preselected shift decoding cycle, and means connected to said recirculating shift register to perform on additional preselected shift cycle upon the said substitution for a blank during said preselected shift decoding cycle before the ending of a correction mode.

4. An error detection and correction system as defined in claim 3 and further including means to generate a label to indicate a successful decoding indicated by no blanks remaining and all parities checking.

5. An error detection and correction system as defined in claim 3 further including means to transfer said label to a temporary storage register to await transfer to a permanent storage.

6. A failsafe decoder for a $(n, k)$ decoder binary group error correction code utilizing parity check equations comprising a threshold detector which provides ternary reception of the binary signal by erasing the digits most probably in error, ternary shift registers for storing and processing code words received from said threshold detector, a first sensing circuit used iteratively to determine whether an even or an odd number of ones are covered by each parity check equation, said first sensing circuit being connected to and receiving a signal from said ternary shift registers, a second sensing circuit used iteratively to determine whether there are none, one, or more than one blanks covered by each parity check equation, said second sensing circuit also being connected to and receiving a signal from said ternary shift registers, a correction-detection circuit using as inputs the outputs of said sensing circuits to provide a signal to correct one blank, a signal indicating more than one blank, and a signal to reject due to uncorrectable error, and means receiving the output signal from said error-detection circuit to correct the errors in each code word or reject due to uncorrectable error.

7. An error detection and correction system utilizing parity check equations for use with a digital communication system comprising means to convert each message block corresponding to a transmitted *n* digit binary code word into a sequence of *n* ternary digits of ones, zeroes and blanks, an *n*-digit 3-state shift register, means to serially load the digits of each message block into said *n*-digit 3-state shift register upon said conversion, means to examine iteratively the digits defined by each of a set of parity check equations, said examining means being connected to and receiving an input from said *n*-digit 3-state shift register, means to detect the occurrence of a single blank, said detecting means also being connected to and receiving an input from said *n*-digit 3-state shift register, and means to substitute a zero or blank for said detected single blank, said substituting means simultaneously receiving an input from said examining means and said detecting means.

8. A failsafe decoding system utilizing parity check equations for binary group error correction codes in which most errors are corrected comprising first detector means for erasing the digits most probably in error, said erasures resulting in blanks, means connected to said first detector for filling in said blanks with a one or a zero by the use of a set of parity check equations for said code, and a second detector means connected to said filling in means for detecting residual errors by further parity checks.

References Cited

UNITED STATES PATENTS

| | | | |
|---|---|---|---|
| 2,881,352 | 4/1959 | Nauta et al. | 328—115 X |
| 3,200,372 | 8/1965 | Hamburgen | 340—146.1 |
| 3,259,896 | 7/1966 | Pan | 340—347 |
| 3,349,371 | 10/1967 | Brothman et al. | 340—146.1 |

MALCOLM A. MORRISON, *Primary Examiner.*

CHARLES E. ATKINSON, *Assistant Examiner.*

U.S. Cl. X.R.

340—167